(12) United States Patent
Chang

(10) Patent No.: US 10,773,544 B2
(45) Date of Patent: Sep. 15, 2020

(54) BICYCLE REAR WHEEL HUB

(71) Applicant: Kuo-Ching Chang, Taichung (TW)

(72) Inventor: Kuo-Ching Chang, Taichung (TW)

( * ) Notice: Subject to any disclaimer, the term of this patent is extended or adjusted under 35 U.S.C. 154(b) by 322 days.

(21) Appl. No.: 15/928,466

(22) Filed: Mar. 22, 2018

(65) Prior Publication Data

US 2019/0291506 A1 Sep. 26, 2019

(51) Int. Cl.
*B60B 1/04* (2006.01)
*B60B 27/02* (2006.01)
*B60B 1/00* (2006.01)

(52) U.S. Cl.
CPC ............ *B60B 1/042* (2013.01); *B60B 1/003* (2013.01); *B60B 1/041* (2013.01); *B60B 27/023* (2013.01); *B60B 2360/102* (2013.01); *B60B 2360/3416* (2013.01); *B60B 2900/113* (2013.01); *B60B 2900/311* (2013.01)

(58) Field of Classification Search
CPC ......... B60B 1/003; B60B 1/041; B60B 1/042; B60B 27/023
See application file for complete search history.

(56) References Cited

U.S. PATENT DOCUMENTS

| | | | | |
|---|---|---|---|---|
| 5,882,088 A * | 3/1999 | Yahata | ..................... | B62M 9/10 301/110.5 |
| 7,306,292 B2 * | 12/2007 | Muraoka | ............... | B60B 27/023 301/61 |
| 7,651,172 B2 * | 1/2010 | Meggiolan | .............. | B60B 1/023 301/110.5 |
| 9,421,818 B2 * | 8/2016 | Koshiyama | ............. | B60B 1/042 |
| 10,549,575 B2 * | 2/2020 | Spahr | ...................... | B60B 1/042 |
| 2006/0197370 A1 * | 9/2006 | Mercat | .................... | B60B 1/041 301/59 |
| 2007/0090686 A1 * | 4/2007 | Okajima | ............... | B60B 21/062 301/124.1 |
| 2008/0211291 A1 * | 9/2008 | Meggiolan | ............ | B60B 1/0261 301/58 |
| 2009/0058179 A1 * | 3/2009 | Addink | ................. | B60B 1/0261 301/58 |
| 2009/0160243 A1 * | 6/2009 | Mercat | ................... | B60B 1/003 301/75 |

* cited by examiner

*Primary Examiner* — Kip T Kotter
(74) *Attorney, Agent, or Firm* — Rosenberg, Klein & Lee

(57) ABSTRACT

A bicycle real wheel hub includes pulling spokes and static spokes connected to the disks thereof. The hub includes a tubular portion with two disks respectively connected to two ends of the tubular portion. Multiple protrusions protrude from the inner side of each disk. The head of each pulling spoke is secured to the protrusion corresponding thereto. The head of each static spoke is secured to the disks. The heads of the pulling spokes are located closer to the middle point of the tubular portion than the heads of the static spokes. When the hub rotates, the static spokes provide strength in the axial direction of the hub, and the pulling spokes have strong tension so that the hub bears higher torque.

4 Claims, 7 Drawing Sheets

BICYCLE REAR WHEEL HUB

BACKGROUND OF THE INVENTION

1. Fields of the Invention

The present invention relates to a bicycle rear wheel hub, and more particularly, to a bicycle rear wheel hub using pulling spokes and static spokes to have better torque and strength in transverse direction.

2. Descriptions of Related Art

The conventional bicycle wheels are connected to the bicycle frame by the hub, especially for the rear wheel hub which relates to the movement of the bicycle. The rear wheel hub includes multiple spokes that are connected between the bicycle wheel rim and the hub. The spokes are required to have sufficient strength so as to overcome the high torque when the wheel move and turns.

The conventional arrangement of the spokes connected between the wheel rim and the hub. The spokes are arranged either in a radial manner or a crossing manner. The latest wheel bub includes pulling spokes and static spokes. Some of the wheel hub includes multiple elongate slots defined through the disks of the hub so as to be connected with the pulling spokes, nevertheless, the elongate slots weak the strength of the disks. Furthermore, when installing the pulling spokes, the assemblers have to extend the pulling spokes through the holes in the disks from a narrow and concaved space located outside of the disks. The assembling processes become complicated and inconvenient.

The present invention intends to provide a bicycle rear wheel hub that improves the shortcomings mentioned above.

SUMMARY OF THE INVENTION

The present invention relates to a bicycle rear wheel hub and comprises a tubular portion and two disks are respectively connected to two ends of the tubular portion. Each disk has an inner side and an outer side, wherein the inner side faces the tubular portion and is located opposite to the outer side. Multiple protrusions protrude from the inner side and are evenly spaced apart from each other. A separation space is formed between adjacent protrusions. Each protrusion has a first hole defined therethrough, and two open ends of each of the first holes face the separation space corresponding thereto.

Each disk has multiple second holes defined therethrough and communicating with the inner and outer sides. One of two open ends of each second hole communicates with the inner side and faces the separation space. Multiple pulling spokes each have a head and a shank. The head of each pulling spoke is secured in the first hole of the protrusion corresponding thereto. The shank of each pulling spoke extends through the separation space and extends outward. Multiple static spokes each have a head and a shank. The head of each static spoke is located at the inner side and stopped by the periphery of the second hole. The shank of each static spoke extends through the disk and extends outward.

Preferably, the hub defines a first rotational direction as the forward direction. The direction from the head of the pulling spokes toward the shank of the pulling spokes is opposite to the first rotational direction. The direction from the shank of the static spokes toward the head of the static spokes is the same as the first rotational direction.

Preferably, each of the disks includes multiple third holes defined through the inner side and the outer side thereof. The static spokes extend through the third holes which are located between the first holes and the protrusions.

Preferably, the protrusions are located at the inner side and close to the periphery of the disk corresponding thereto. An annular space is defined between the protrusions and the tubular portion. The annular space communicates with the separation space.

Preferably, the pulling spokes are made of steel or carbon fibers, and the static spokes are made of steel.

The primary object of the present invention is to provide a bicycle real wheel hub that has better torque and strength in transverse direction.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
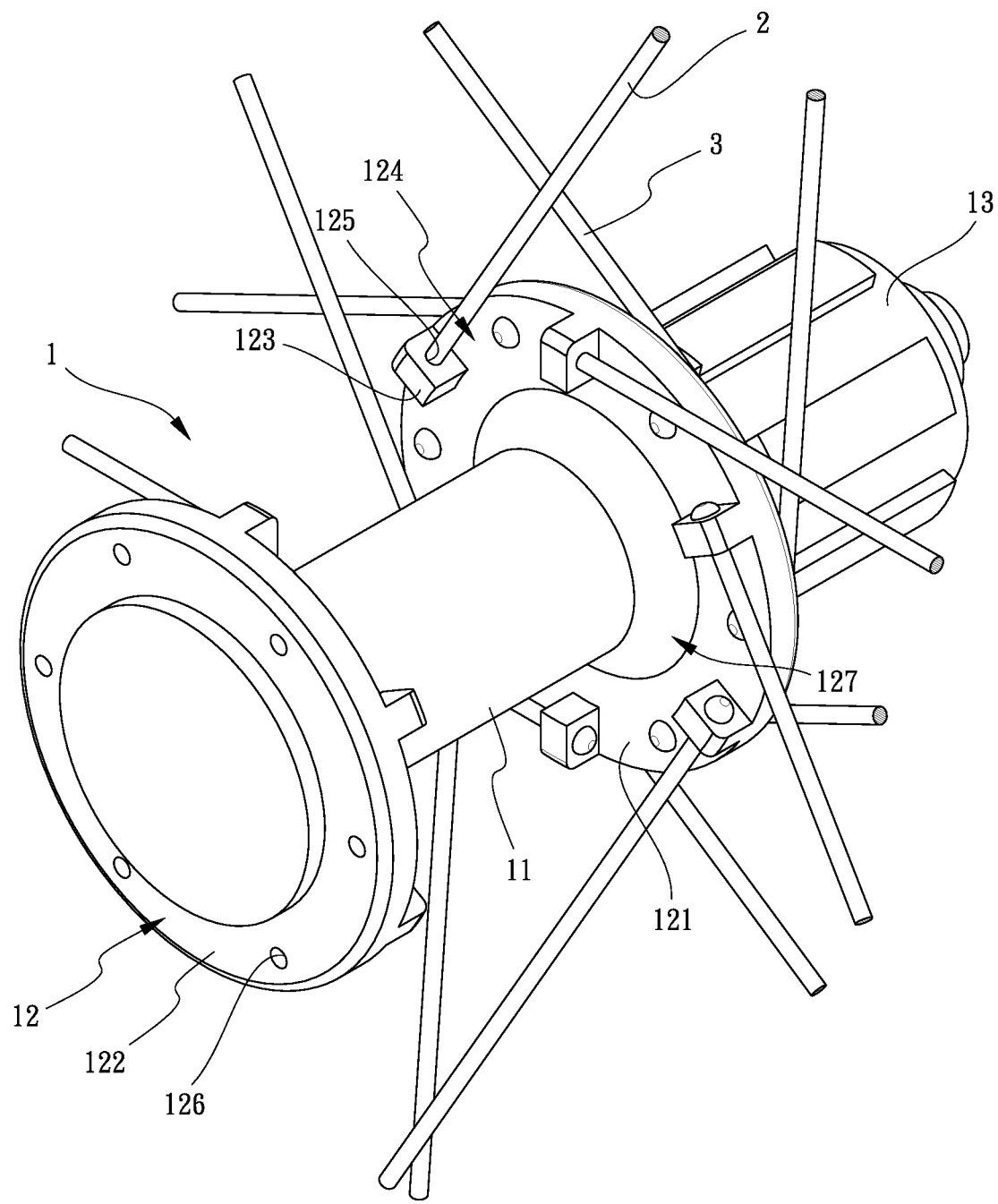
FIG. 1 is a perspective view to show the bicycle rear wheel hub of the present invention.
Figure 2:
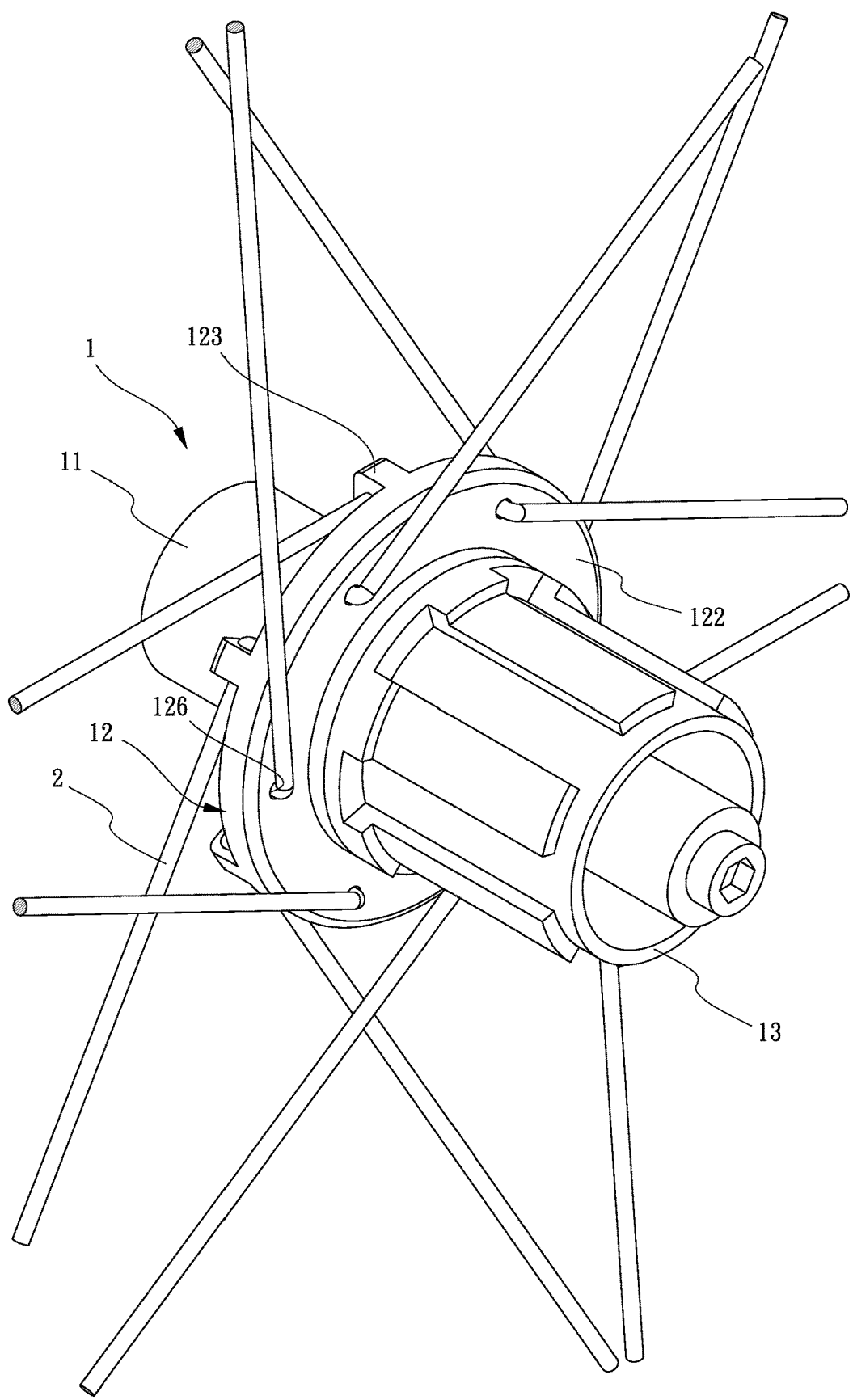
FIG. 2 is another perspective view to show the bicycle rear wheel hub of the present invention.
Figure 3:
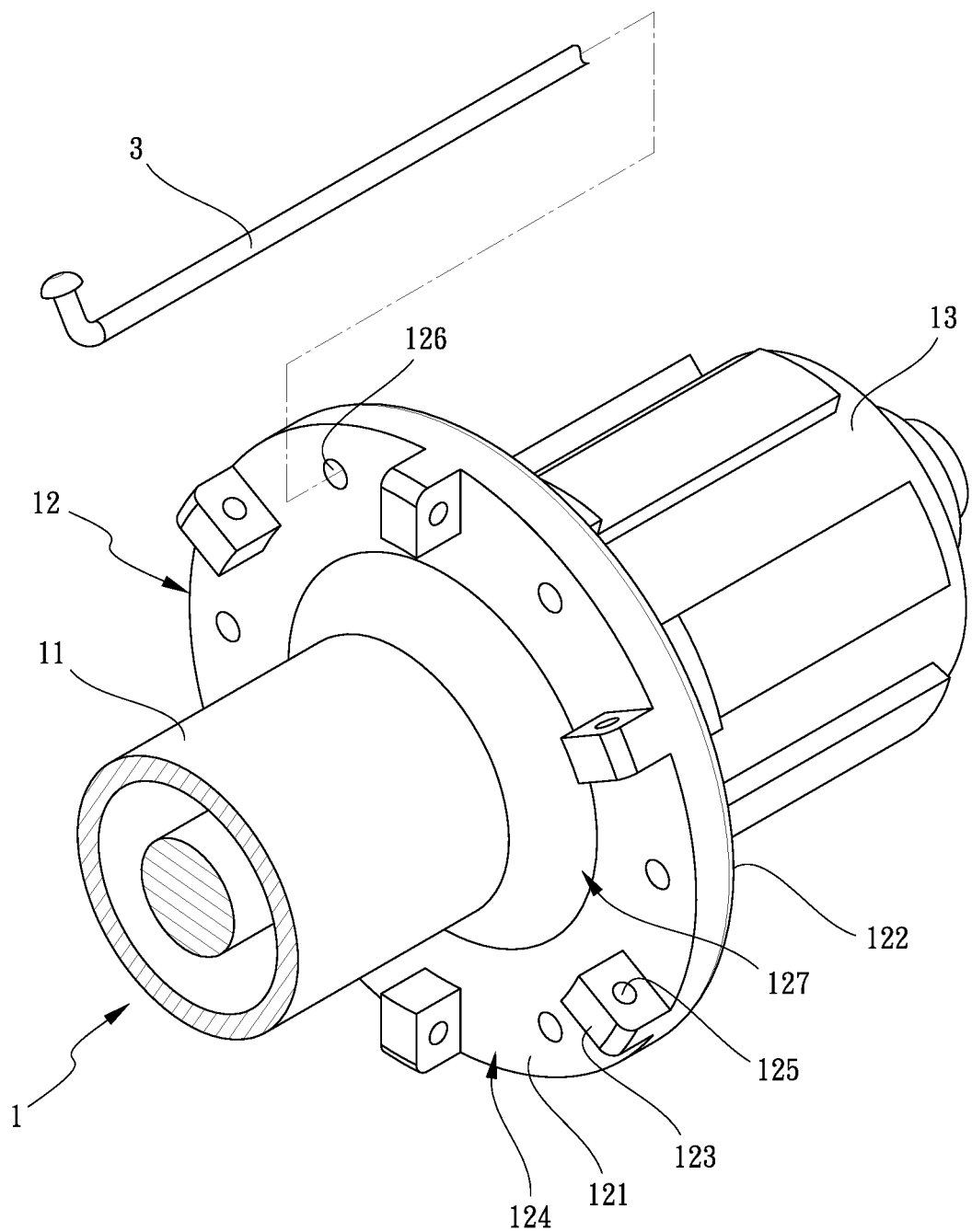
FIG. 3 shows that a pulling spoke is to be connected to the disk of the hub.
Figure 4:
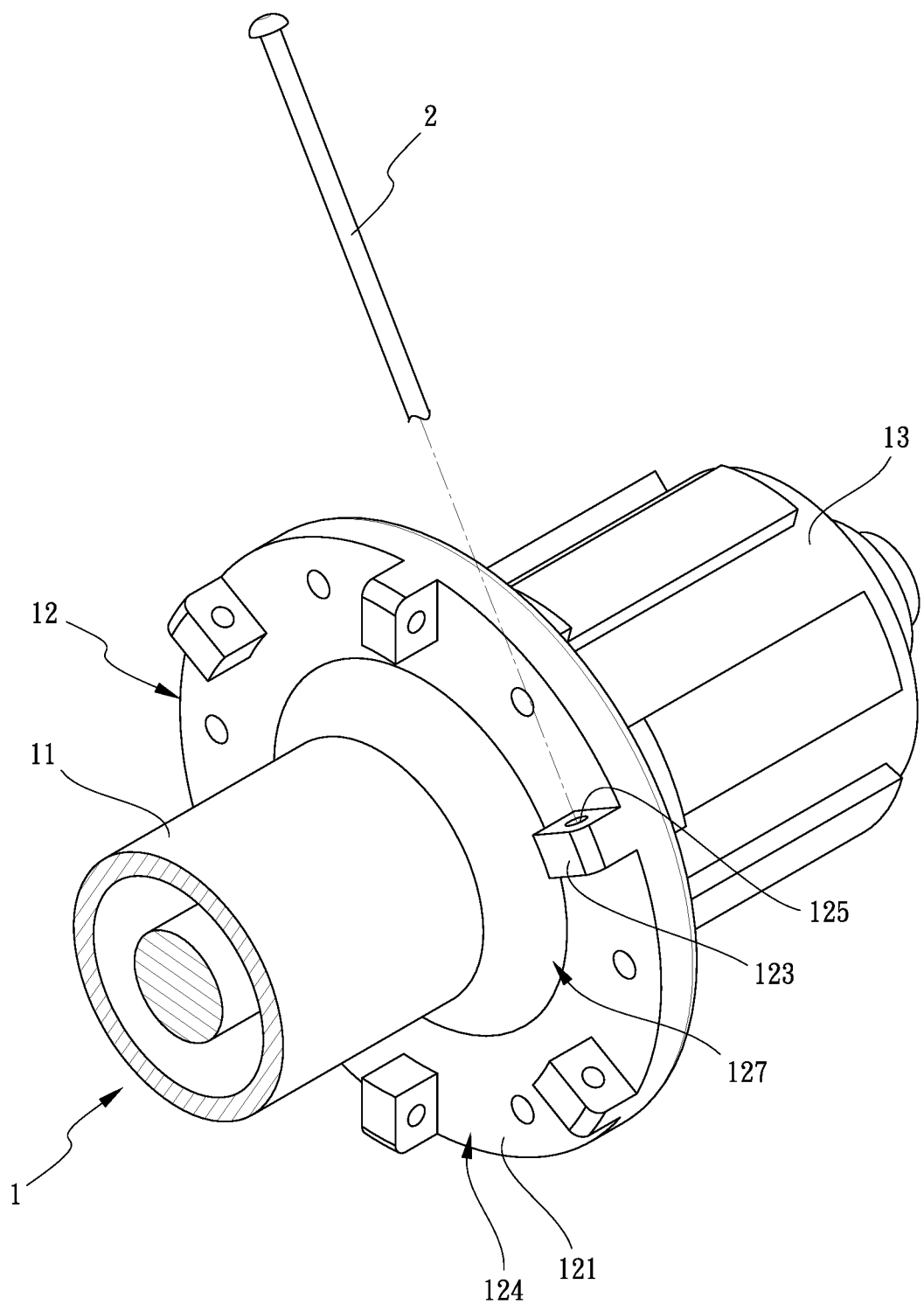
FIG. 4 shows that a static spoke is to be connected to the disk of the hub.

Referring to FIGS. 1 to 4, the bicycle rear wheel hub 1 of the present invention comprises a tubular portion 11 and two disks 12 are respectively formed with the two ends of the tubular portion 11 in this embodiment. Each disk 12 has an inner side 121 and an outer side 122, wherein the inner side 121 faces the tubular portion 11 and is located opposite to the outer side 122. The tubular portion 11 is a hollow tube through which the axle of the wheel extends (both not shown). The diameter of the disks 12 is larger than that of the tubular portion 11. The disks 12 are solid disks, although hollowed disks 12 can also be used in the present invention.

Multiple protrusions 123 protrude from the inner side 121 and are evenly spaced apart from each other. A separation space 124 is formed between adjacent protrusions 123. Each protrusion 123 has a first hole 125 defined therethrough, wherein the two open ends of each of the first holes 125 face the separation space corresponding thereto. Each disk 12 has multiple second holes 126 defined therethrough and communicating with the inner and outer sides 121, 122. One of two open ends of each second hole 126 communicates with the inner side 121 and faces the separation space 124.

Multiple pulling spokes 2 each have a head and a shank, wherein the head of each pulling spoke 2 is secured in the first hole 125 of the protrusion 123 corresponding thereto, and the shank of each pulling spoke 2 extends through the separation space 124 and extends outward. The pulling spokes 2 are made of steel or carbon fibers. The protrusions 123 improve the shortcomings found in the elongate slots of the conventional disks.

Multiple static spokes 3 each have a head and a shank, wherein the head of each static spoke 3 is located at the inner side 121 and stopped by the periphery of the second hole 126, and the shank of each static spoke 3 extends through the disk 12 and extending outward. The static spokes 3 are made of steel.

Figure 5:
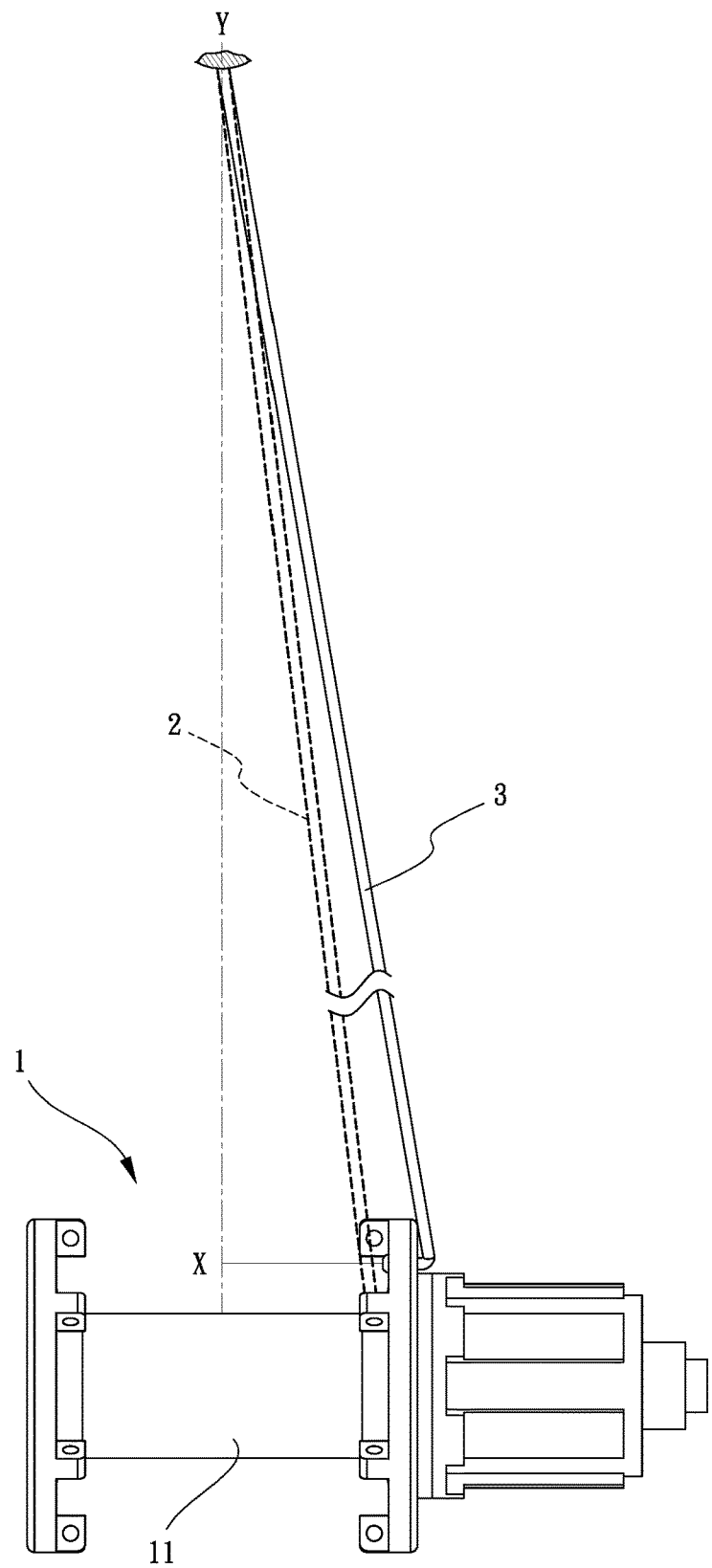
FIG. 5 is a cross sectional view, taken along line V-V in FIG. 1.

As shown in FIG. 5, the heads of the pulling spokes 2 are located closer to the middle point of the tubular portion 11 than the heads of the static spokes 3. Therefore, when the hub 1 rotates, the component force in the Y direction of the pulling spokes 2 is larger than the component force in the X direction of the pulling spokes 2. This increases the tension of the pulling spokes 2. The component force in the X direction of the static spokes 3 is larger than the component force in the X direction of the pulling spokes 2, so that the static spokes 3 provide better transverse strength to the hub 1 which has better torque and higher strength in the transverse direction.

Besides, the length of the tubular portion 11, the thickness of the disks 12, the distances between the protrusions 123 and the periphery of the disk 12 can be adjusted to change the distance from the middle point of the tubular portion 11 and the first holes 125 and the second holes 126, so that the torque and the transverse strength of the hub 1 can be adjusted.

Figure 6:
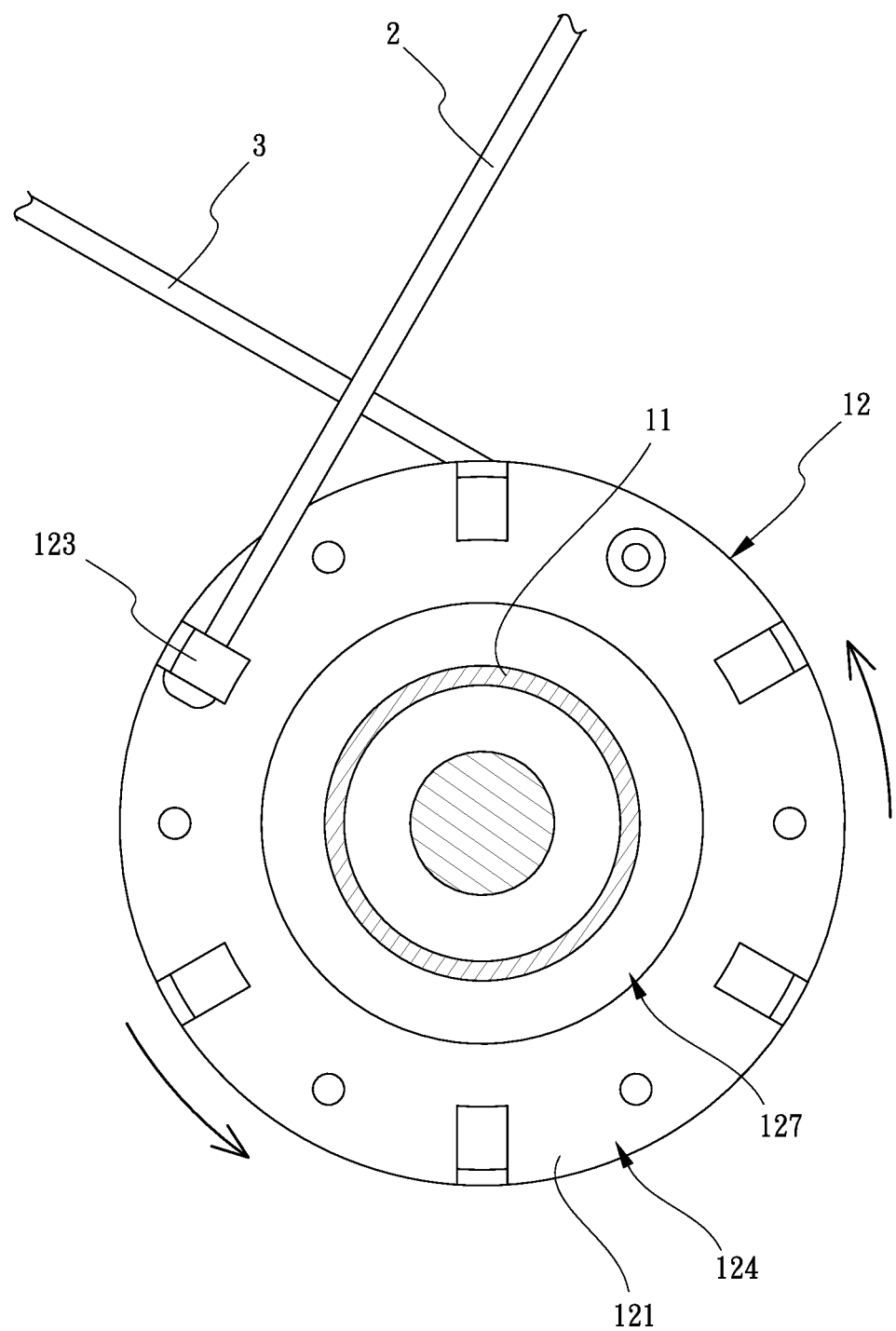
FIG. 6 is a cross sectional view, taken along line VI-VI in FIG. 1.

As shown in FIG. 6, the hub 1 defines a first rotational direction (shown by arrows) as the forward direction which drives the bicycle forward. The direction from the head of the pulling spokes 2 toward the shank of the pulling spokes 2 is opposite to the first rotational direction. The direction from the shank of the static spokes 3 toward the head of the static spokes 3 is the same as the first rotational direction.

It is noted that if the bicycle wheel uses disk-brake system, when the hub 1 is clamped and stopped, the inertia force may bend the pulling spokes 2 because the braking force is way larger than the driving force. The present invention arranges the pulling spokes 2 and the static spokes 3 in opposite directions so as to properly eliminate the bending problems for the spokes.

It is also noted that the protrusions 123 are located at the inner side 121 and close to the periphery of the disk 12 corresponding thereto. An annular space 127 is defined between the protrusions 123 and the tubular portion 11. The annular space 127 communicates with the separation space 124.

Figure 7:
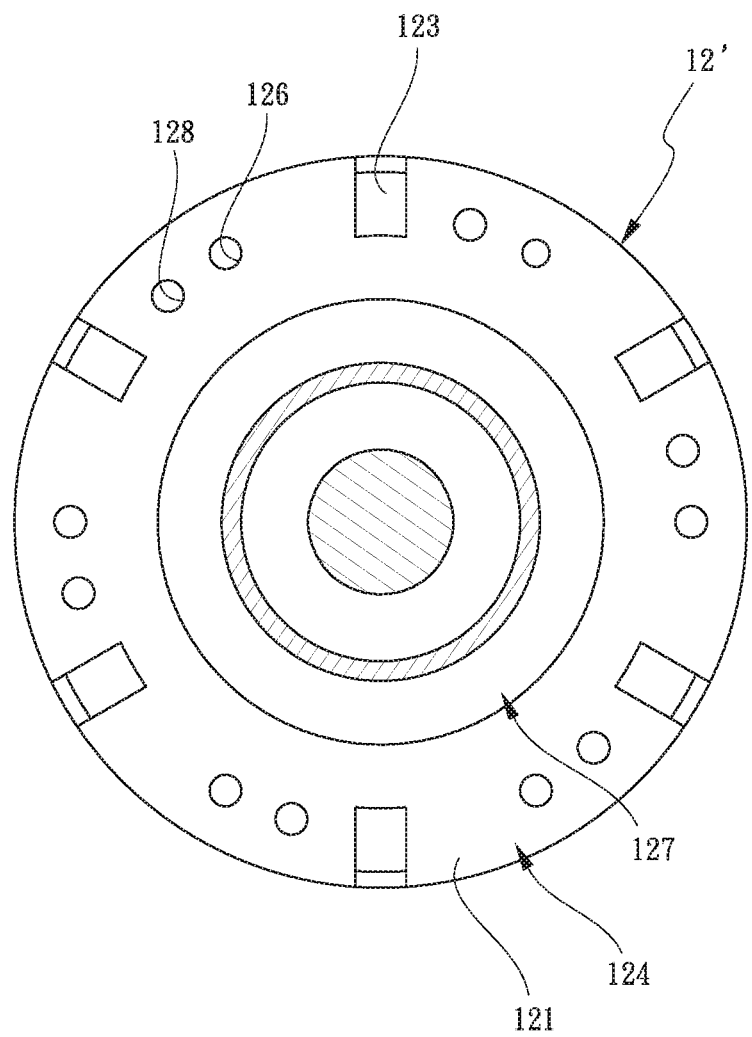
FIG. 7 is a perspective view to show another embodiment of the bicycle rear wheel hub of the present invention.

As shown in FIG. 7, another embodiment of the present invention shows that each of disks 12' includes multiple third holes 128 defined through the inner side 121 and the outer side 122 thereof. The static spokes 3 extend through the third holes 128, and the third holes 128 are located between the first holes 125 and the protrusions 123. The third holes 128 are designed to be connected with the static spokes 3.

While we have shown and described the embodiment in accordance with the present invention, it should be clear to those skilled in the art that further embodiments may be made without departing from the scope of the present invention.

What is claimed is:

1. A bicycle real wheel hub comprising:
a tubular portion and two disks respectively formed with two ends of the tubular portion, each disk having an inner side and an outer side, the inner side facing the tubular portion and located opposite to the outer side;
multiple protrusions protruding from the inner side and evenly spaced apart from each other, a separation space formed between adjacent protrusions, each protrusion having a first hole defined therethrough, two open ends of each of the first holes facing the separation space corresponding thereto;
each disk having multiple second holes defined therethrough and communicating with the inner and outer sides, one of two open ends of each second hole communicating with the inner side and facing the separation space;
multiple pulling spokes each having a head and a shank, the head of each pulling spoke secured in the first hole of the protrusion corresponding thereto, the shank of each pulling spoke extending through the separation space and extending outward, and
multiple static spokes each having a head and a shank, the head of each static spoke located at the inner side and stopped by a periphery of the second hole, the shank of each static spoke extending through the disk and extending outward.

2. The bicycle real wheel hub as claimed in claim 1, wherein the hub defines a first rotational direction as a forward direction, a direction from the head of the pulling spokes toward the shank of the pulling spokes is opposite to the first rotational direction, a direction from the shank of the static spokes toward the head of the static spokes is the same as the first rotational direction.

3. The bicycle real wheel hub as claimed in claim 1, wherein the protrusions are located at the inner side and close to a periphery of the disk corresponding thereto, an annular space is defined between the protrusions and the tubular portion, the annular space communicates with the separation space.

4. The bicycle real wheel hub as claimed in claim 3, wherein the pulling spokes are made of steel or carbon fibers, the static spokes are made of steel.

\* \* \* \* \*